US011582991B2

(12) United States Patent
Damhuis et al.

(10) Patent No.: US 11,582,991 B2
(45) Date of Patent: Feb. 21, 2023

(54) RETORT SYSTEM (71) Applicant: John Bean Technologies Corporation, Chicago, IL (US)

(72) Inventors: Eduard Hendrikus Johannes Damhuis, Bousval (BE); Kevin Andrew Carlson, Clovis, CA (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 933 days.

(21) Appl. No.: 16/430,318

(22) Filed: Jun. 3, 2019

(65) Prior Publication Data
US 2020/0375224 A1    Dec. 3, 2020

(51) Int. Cl.
| | |
|---|---|
| G05D 11/00 | (2006.01) |
| B01J 3/00 | (2006.01) |
| F27D 7/02 | (2006.01) |
| A23L 3/00 | (2006.01) |
| A23L 3/015 | (2006.01) |
| A23L 3/3409 | (2006.01) |
| A23L 3/3418 | (2006.01) |

(Continued)

(52) U.S. Cl.
CPC ............ *A23L 3/001* (2013.01); *A23L 3/0155* (2013.01); *A23L 3/3418* (2013.01); *A23L 3/34095* (2013.01); *A23L 3/36* (2013.01); *G05D 11/003* (2013.01); *A23B 4/16* (2013.01); *A23L 3/003* (2013.01); *B01J 3/002* (2013.01); *F27D 7/02* (2013.01)

(58) Field of Classification Search
None
See application file for complete search history.

(56) References Cited

U.S. PATENT DOCUMENTS

| | | |
|---|---|---|
| 4,057,391 A | 11/1977 | Yamaguchi |
| 5,280,748 A | 1/1994 | Pardo |
| 5,283,033 A | 2/1994 | Dodrill |

(Continued)

FOREIGN PATENT DOCUMENTS

| | | |
|---|---|---|
| EP | 0 686 400 A1 | 12/1995 |
| EP | 0 832 570 A1 | 4/1998 |

(Continued)

OTHER PUBLICATIONS

Bell & Gossett (Year: 2010).*

(Continued)

*Primary Examiner* — Steven S Anderson, II
*Assistant Examiner* — Kurt J Wolford
(74) *Attorney, Agent, or Firm* — Christensen O'Connor Johnson Kindness PLLC (57) ABSTRACT

A recirculation circuit for a processing vessel is configured to process a load with a process fluid. The recirculation circuit includes a first circuit portion configured to recirculate a first portion of the process fluid through the vessel. The first circuit portion includes a first pump having a first flow rate and a first output pressure and a heat exchanger in fluid communication with the first pump. A second circuit portion is configured to recirculate a second portion of the process fluid through the vessel. The second circuit portion includes a second pump having a second flow rate higher than the first flow rate and a second output pressure lower than the first output pressure.

21 Claims, 6 Drawing Sheets

(51) Int. Cl.
*A23L 3/36* (2006.01)
*A23B 4/16* (2006.01)

(56) References Cited

U.S. PATENT DOCUMENTS

| | | | |
|---|---|---|---|
| 5,527,516 | A | 6/1996 | Yamamoto et al. |
| 7,008,659 | B1 | 3/2006 | Ono |
| 7,966,929 | B2 | 6/2011 | Walden et al. |
| 8,808,638 | B2 | 8/2014 | Tomoda et al. |
| 8,865,087 | B2 | 10/2014 | Buczynski |
| 9,055,756 | B2 | 6/2015 | Lambert |
| 9,205,158 | B1 | 12/2015 | Jacob et al. |
| 10,021,891 | B2 | 7/2018 | Rohde |
| 2005/0249650 | A1 | 11/2005 | Johannes Damhuis et al. |
| 2013/0071546 | A1 | 3/2013 | Tomoda et al. |
| 2014/0248573 | A1 | 9/2014 | Sauter |
| 2017/0215459 | A1* | 8/2017 | Damhuis .................. A23L 3/12 |
| 2018/0245855 | A1 | 8/2018 | Deivasigamani et al. |

FOREIGN PATENT DOCUMENTS

| | | |
|---|---|---|
| NL | 1 024 796 C2 | 5/2005 |
| WO | 2004052526 A1 | 6/2004 |

OTHER PUBLICATIONS

Bell & Gossett Accessibility Date (Year: 2022).*
Drawing showing prior art fluid retort system that includes first and second pumps for withdrawing fluid from a vessel, 1 page.
"Static SWS Sterilizer," Surdry, <http://stockamerica.com/wp-content/uploads/2018/04/SURDRY-Static-Tech-Sheet.pdf> [retrieved Mar. 28, 2019], 1 page.
International Search Report and Written Opinion dated Aug. 11, 2020, issued in corresponding International Application No. PCT/US2020/032820, filed May 14, 2020, 11 pages.
G. Manenti, "A calculation Procedure for a Heat Exchanger and Bypass Equipment," Computers and Chemical Engineering 35(11):2378-2388, Nov. 2011.

* cited by examiner

Fig. 2.

(PRIOR ART RETORT STERILIZATION)

RETORT SYSTEM

BACKGROUND

Overpressure retorts are used for the in-container preservation of foodstuffs, such as for pasteurization or commercial sterilization processes (hereinafter sometimes collectively referred to as a "load process", "processing a load", or similar). In general, these machines use a combination of pressure and temperature to commercially sterilize packaged food according to a predefined schedule.

Additional overpressure for processing containers of foodstuffs may be achieved in a spray retort, where water or another suitable process fluid (hereinafter "process fluid") is sprayed from the top (and optionally also from the sides) of the vessel through the load of containers. The water may be heated through external means, or alternatively steam may be directly injected into the vessel.

Figure 1:
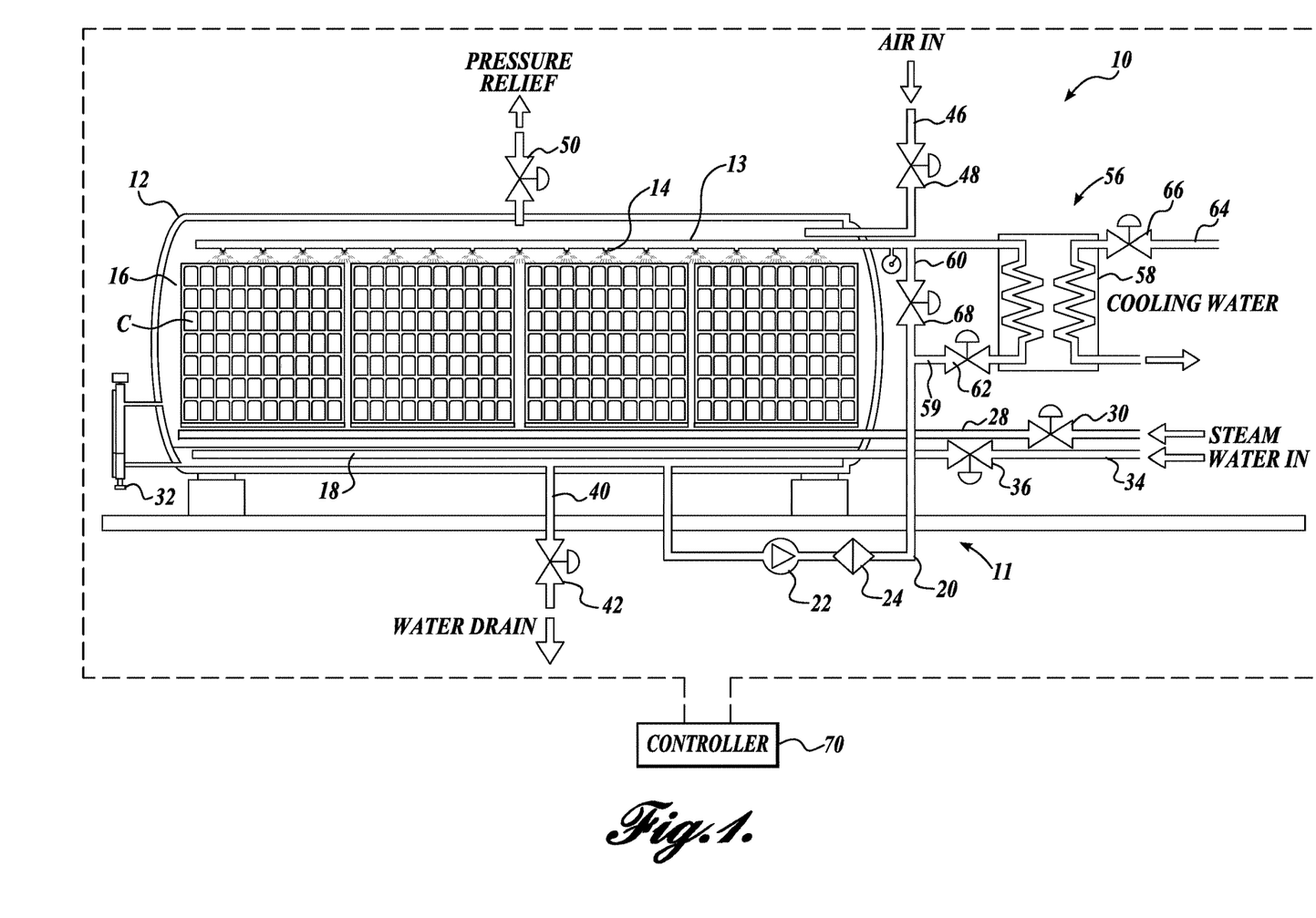
FIG. 1 is a schematic view of a prior art steam-water-spray (SWS) retort system.

FIG. 1 illustrates a prior art steam-water-spray (SWS) retort system 10. The prior art SWS retort system 10 generally uses direct steam injection in combination with continuous circulation of process fluid and application of air overpressure when needed. In that regard, the prior art SWS retort system 10 includes a cylindrical pressure vessel 12 that houses a load 16 of containers C. The vessel 12 contains a small amount of sterile process fluid 18 that collects in the bottom of the retort and outlets into a re-circulation circuit 11 having a main process fluid circulation pipe 20. The process fluid 18 is continuously circulated back into the vessel 12 with a re-circulation pump 22. More specifically, when a first valve 68 in the main process fluid circulation pipe 20 is open, the pump 22 circulates the process fluid 18 back into the vessel 12 through one or more spraying tubes 13 having spray nozzles 14 installed over a length of the vessel. In this way, a thorough mixing of the steam, water and the air is achieved. The process fluid 18 passes through a filter 24 to minimize the risk of blocking the spray nozzles 14.

Steam pipes 28 having spreaders (not shown) extend into the vessel 12 above the water level, distributing the steam over the length of the vessel 12 when a proportional steam valve 30 is opened. The process fluid level inside the vessel 12 is continuously monitored and controlled to keep it below the steam pipes 28, and thus below the load 16, with a fluid level gauge 32. Moreover, the process fluid level may be raised before the load process begins by placing a process fluid source into fluid communication with the interior of the vessel 12 through a fluid inlet pipe 34 having a fluid inlet valve 36. In addition, the fluid level may be lowered by allowing process fluid (and steam condensate) to flow out of an outlet in the vessel and into a fluid drain pipe 40 having a fluid outlet valve 42.

Air overpressure can be applied in the vessel 12 during the complete processing cycle through a pressurized air pipe 46 having one or more automatic modulating valves. For instance, a compressed air modulating valve 48 may be opened to allow compressed air into the vessel 12 and a pressure relief modulating valve 50 may be opened to relieve pressure (air and steam vapor) in the vessel 12.

The prior art SWS retort system 10 further includes a heat exchanger assembly 56 for cooling some of the process fluid during a cooling phase. The heat exchanger assembly 56 includes a plate heat exchanger 58 having a first side in selective fluid communication with the main process fluid circulation pipe 20 through a branched heat exchanger inlet pipe 59 having a heat exchanger valve 62. Cooling water flows into a second side of the heat exchanger 58 through a cooling water pipe 64 having a cooling water valve 66. In that manner, heat is removed from the part of the process fluid 18 circulated through the first side of the heat exchanger 58 by the cooling water passing through the second side of the heat exchanger. The cooled process fluid 18 is then circulated back into the retort to remove heat from the load 16. By cooling the commercially sterile process fluid 18, rather than introducing cooling water from a separate source, the commercially sterilized containers C of the load 16 are cooled in commercially sterile conditions (i.e., the process fluid does not become contaminated). When no cooling is desired, such as during the come-up and cook phase of the load process, the process fluid 18 bypasses the heat exchanger 58 through a bypass portion 60 having a bypass valve 68.

The system 10 is in wired or wireless communication with a controller 70 that can be programmed in accordance with process requirements of the load 16. For instance, the controller 70 may include suitable circuitry for selectively opening one or more valves of the system 10 for ensuring that a pre-programmed temperature profile (which can be adjusted with steam and/or cooled process fluid) and a pre-programmed pressure profile (which can be adjusted with pressurized air) is followed. In some embodiments, the controller 70 may include suitable circuitry for activating other components of the system (such as sensors, switches, etc.) and/or for processing input or output signals of the various components.

Figure 2:
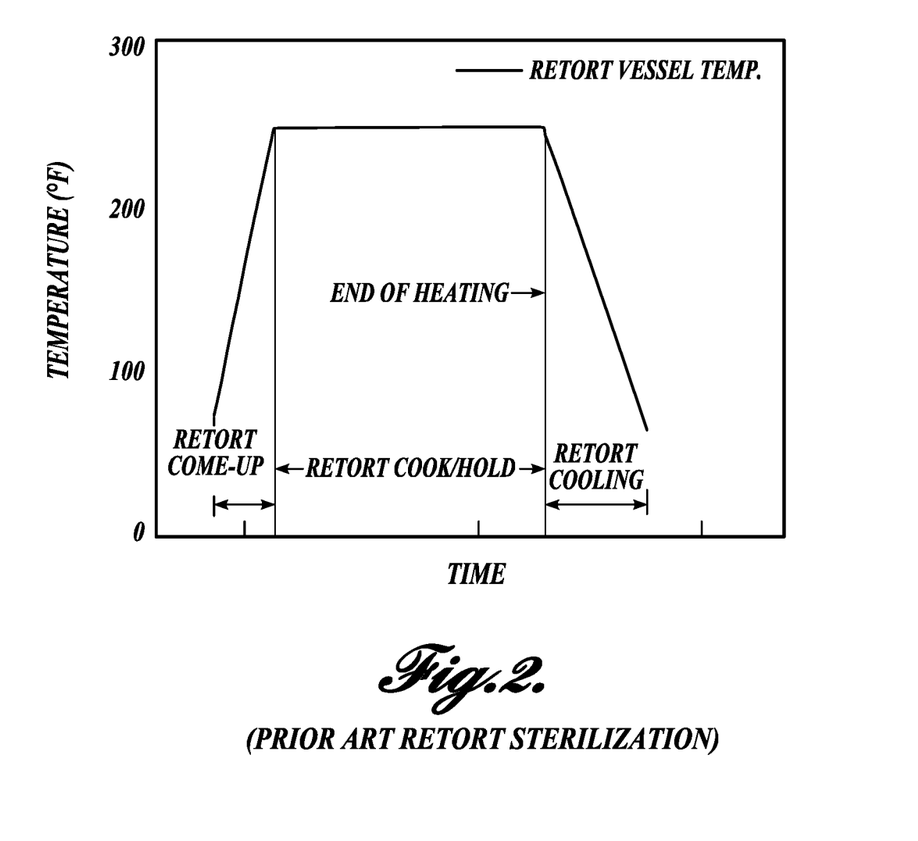
FIG. 2 is a graphical depiction of an exemplary three phase sterilization process of a retort system, wherein the three phase sterilization process includes a first initial heating ("come-up") phase, a second cook/hold phase, and a third cooling phase.

The load process for the prior art SWS retort system 10 starts after a door of the vessel 12 is closed and locked. With reference to FIG. 2, an exemplary pre-programmed load process cycle includes three phases. During a first come-up phase, the vessel goes from a starting temperature, such as room temperature, to a second cook temperature for thermal processing the containers C in the load 16. To raise the temperature during the come-up phase, the re-circulation pump 22 is activated, and the process fluid 18 is re-circulated through the spraying tubes 13 and nozzles 14 such that it is sprayed continuously onto the containers C of the load 16. Steam is also injected directly in the retort through the steam pipes 28 and automatically controlled with the proportional steam valve 30. Moreover, overpressure is used to seal the door when it is initially closed, and it is also used during the come-up phase to help protect the integrity of the contained product (i.e., to balance the pressure on the container walls).

A second cook/hold phase of the load process for the prior art SWS retort system 10 involves holding the temperature of the retort vessel 12 at the cook temperature. During this second cook/hold phase, the process fluid 18 is re-circulated through the spraying tubes 13 and nozzles 14 such that it is sprayed continuously onto the containers C of the load 16. Moreover, the temperature and pressure are independently controlled by means of the proportional valves for steam, compressed air, and pressure relief, and the fluid level is maintained constant.

Finally, during a third cooling phase of the load process for the prior art SWS retort system 10, the vessel 12 is cooled back down to normal temperatures. In the cooling phase, the process fluid 18 is still re-circulated through the spraying tubes 13 and nozzles 14 such that it is sprayed continuously onto the containers C of the load 16. However, part of the recirculating process fluid 18 is diverted into the heat exchanger 58 for cooling before it is recirculated back into the vessel 12 through the spraying tubes 13/nozzles 14. The flow of cooled process fluid is automatically controlled with valves 68, 62, and 66 to follow the preprogrammed temperature profile. Moreover, the pressure inside the vessel 12 is controlled automatically by the compressed air and pressure relief modulating valve 48 and 50.

On completion of the cooling phase, residual pressure is released from the vessel 12. An end of cycle signal assures the operator that the vessel door can be opened.

Passing only part of the recirculating process fluid through the heat exchanger during the cooling phase only has certain advantages compared to retort systems where all the process fluid circulates always (or during all the phases) through the heat exchanger. For instance, a smaller heat exchanger and/or pump may be used since less fluid needs to be cooled, and there is no risk of cooling the process fluid during the come-up or cook phases which may otherwise occur if the cooling water valve malfunctions. More specifically, if process fluid does not bypass the heat exchanger during the come-up or cook (heating) phases, it will not be inadvertently be cooled if the cooling water valve leaks, for instance, when all the process fluid passes through the heat exchanger in all phases.

There are also several disadvantages of passing only part of the recirculating process fluid through the heat exchanger during the cooling phase only. For instance, if only part of the process fluid is diverted into the heat exchanger, the total flow of cooled recirculated process fluid is lower in in comparison to a system where all the process fluid passes through the heat exchanger in all the phases. More specifically, when the cooling phase begins, the pressure drop across the heat exchanger is greater than in the bypass leg 60 of the main process fluid circulation pipe 20, and a higher pressure drop across the heat exchanger results in a lower total flow of cooled fluid into the system.

In that regard, another disadvantage is that only low (L) to medium (M) turbulence heat exchanger plates can be used to limit the pressure drop, which reduces the heat transfer. As such, cooling capacity is somewhat limited by using L or M turbulence plates in the heat exchanger verses using high (H) turbulence plates. Furthermore, the head required to pass the process fluid through the heat exchanger cannot be extremely high (which would be required with higher turbulence plates) when only a single pump is used for circulation.

In addition, a lower flow of cooled process fluid results in a less efficient and/or less homogeneous cooling of the containers C. For instance, the third cooling phase of the load process may be longer in comparison to a system where all the process fluid passes through the heat exchanger in all the phases. Furthermore, the containers C may not be cooled evenly throughout the load 16 during the cooling process. More specifically, the containers C at the top of the load 16 will cool faster than the containers C at the bottom of the load 16.

Higher flow could be achieved with a larger pump having a higher output pressure head with a high flow, but this has disadvantages as well. For instance, a larger pump requires a correspondingly larger motor and larger diameter suction piping. A larger pump/motor having greater height would also require raising the retort vessel. Moreover, the Net Positive Suction Head required (NPSHr), which is the minimum pressure at the suction port of the pump to keep the pump from cavitating (which can cause erosion, noisy slow operation, and damage to the pump), will significantly increase with a larger pump to prevent cavitation. Furthermore, additional overpressure may be required in the vessel to accommodate the NPSHr. In other words, the overpressure required in the vessel correspondingly increases in order to avoid cavitation in the larger pump. As noted above, overpressure is needed to control and maintain container integrity. (Too much overpressure and the container will crush. Too little overpressure and the container will explode.) Accordingly, the more overpressure needed for the pump to operate, the less flexibility there is in adjusting the overpressure in the vessel to follow a pressure profile to maintain container integrity.

Finally, even with a larger pump, the total flow of process fluid during the cooling phase would still be lower than in the come-up and cook phases due to the pressure drop across the heat exchanger (in comparison to a system that passes all the process fluid through the heat exchanger in all the phases).

Higher flow could also be achieved with a much higher capacity and more expensive heat exchanger having many parallel flow paths to reduce the frictional resistance in the heat exchanger. However, the connection piping to such a high capacity heat exchanger would be very large. For example, a typical system may use four inch diameter pipe connections, whereas a higher capacity heat exchanger may require something like fourteen inch diameter pipes. Such a larger heat exchanger and corresponding piping would also affect the retort layout.

Accordingly, an improved SWS retort system that provides increased cooling capacity without requiring a larger pump or other undesired modifications to the retort vessel is needed.

SUMMARY

A recirculation circuit for a processing vessel is configured to process a load with a process fluid. The recirculation circuit includes a first circuit portion configured to recirculate a first portion of the process fluid through the vessel. The first circuit portion includes a first pump having a first flow rate and a first output pressure and a heat exchanger in fluid communication with the first pump. A second circuit portion is configured to recirculate a second portion of the process fluid through the vessel. The second circuit portion includes a second pump having a second flow rate higher than the first flow rate and a second output pressure lower than the first output pressure.

A fluid retort system includes a vessel containing a process fluid and a first recirculation circuit portion configured to recirculate a first portion of the process fluid through the vessel. The first recirculation circuit portion includes a first pump having a first flow rate and a first output pressure, a heat exchanger in fluid communication with the first pump, and a second recirculation circuit portion configured to recirculate a second portion of the process fluid through the vessel. A second recirculation circuit portion includes a second pump having a second flow rate higher than the first flow rate and a second output pressure lower than the first output pressure.

A method of circulating process fluid in a processing vessel includes in a first configuration, flowing a first portion of the process fluid through a bypass portion of a first circuit portion with a first pump having a first flow rate and a first output pressure, in a second configuration, flowing the first portion of the process fluid through a heat exchanger of the first circuit portion with the first pump, and in both the first and second configurations, flowing a second portion of the process fluid through the vessel with a second pump having a second flow rate higher than the first flow rate and a second output pressure lower than the first output pressure.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Embodiments of the present disclosure are directed to an improved steam-water-spray (SWS) retort system that provides more homogeneous processing and faster cooling when compared to prior art systems. In that regard, the improved SWS retort system is configured to increase the total fluid flow through the retort and hence reduce the temperature differences in the load during the cooling phase.

In general, embodiments of the improved SWS retort system are realized by separating the heat exchanger from the main recirculating fluid circuit and using a separate pump to circulate the process fluid through the heat exchanger. As will become appreciated from the description that follows, the advantages of the improved SWS retort system include at least the following: the height of the retort does not increase; there is more flexibility in the choice of the heat exchanger; the flow may be the same in the cooling phase as it is during the come-up and cook phase; a lower Net Positive Suction Head required (NPSHr) may be used for the heat exchanger pump; and the overpressure required in the retort is lower.

Figure 3:
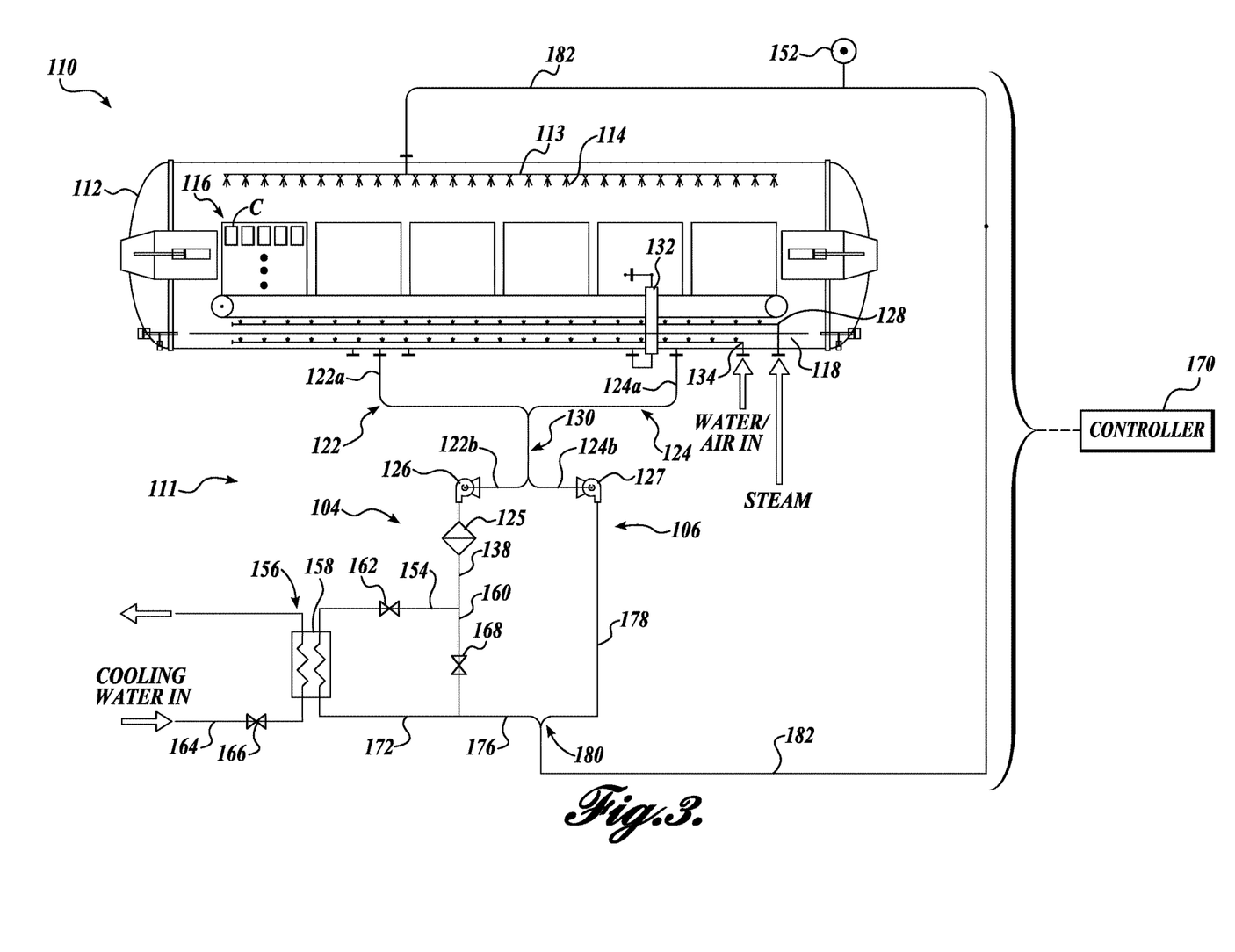
FIG. 3 is a schematic view of a SWS retort system formed in accordance with an exemplary embodiment of the present disclosure.

An exemplary embodiment of an improved SWS retort system 110 is shown schematically in FIG. 3. For convenience, components of the improved SWS retort system 110 that are similar to the prior art SWS retort system 10 described above include the same references numerals except in the '100 series. In that regard, the components of the improved SWS retort system 110 that are similar to the prior art SWS retort system 10 will not be described in detail. Moreover, it should be appreciated that aspects of the prior art SWS retort system 10 may be incorporated into the improved SWS retort system 110.

The improved SWS retort system 110 includes a processing vessel, such as a cylindrical pressure vessel 112 that houses a load 116 of containers C, and like the prior art SWS retort system 10, generally uses direct steam injection (through steam pipe(s) 128) in combination with a continuous circulation of process fluid and application of air overpressure (through pipe 134) when needed to commercially sterilize or otherwise process the containers C. The process fluid level inside the vessel 112 is continuously monitored and controlled with a fluid level gauge 132 and a fluid inlet pipe 134. In addition, the fluid level may be lowered by allowing process fluid (and steam condensate) to flow out of a drain outlet/pipe in the vessel (not shown).

Figure 4:
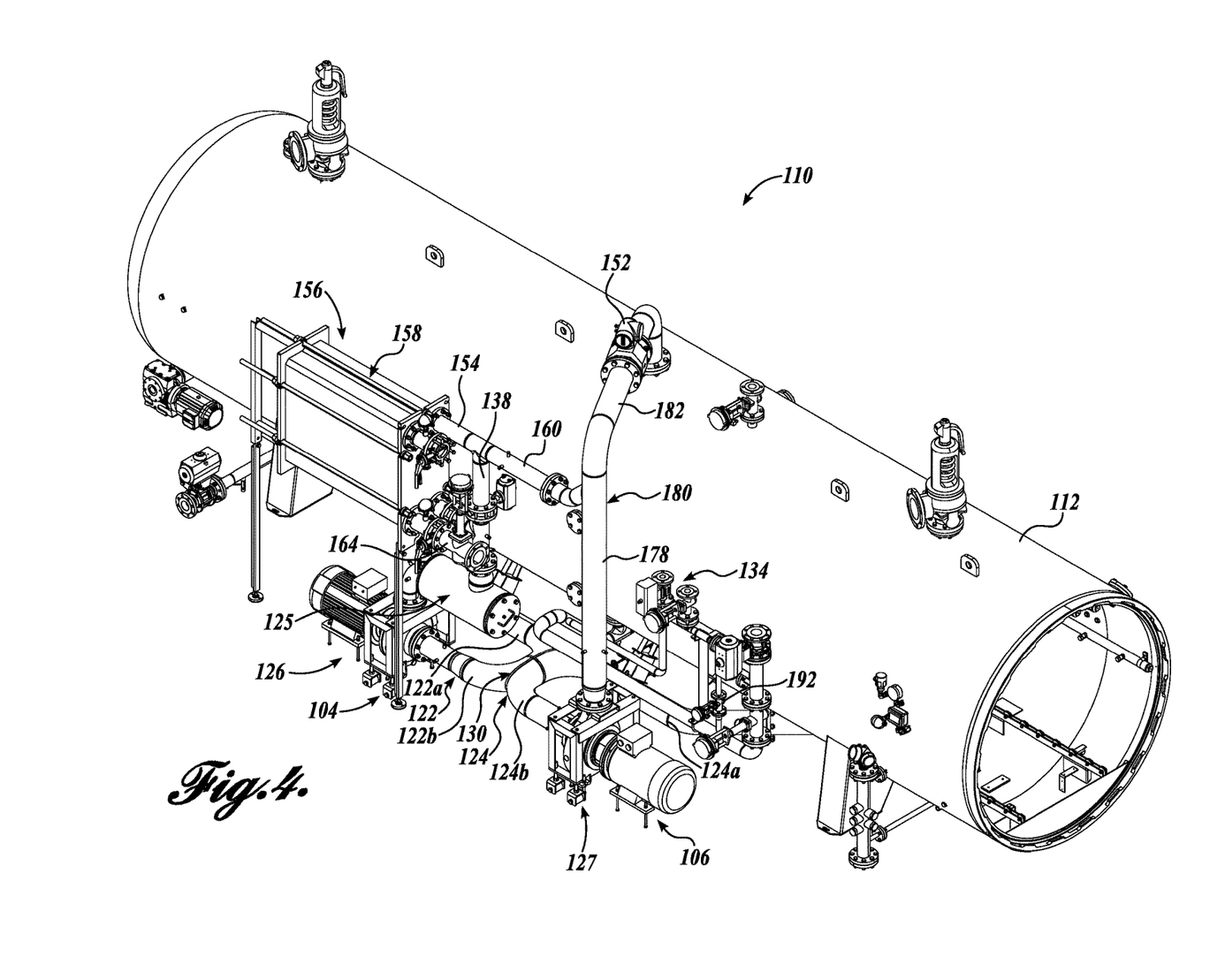
FIG. 4 is a top isometric view of the SWS retort system represented schematically in FIG. 3.
Figure 5:
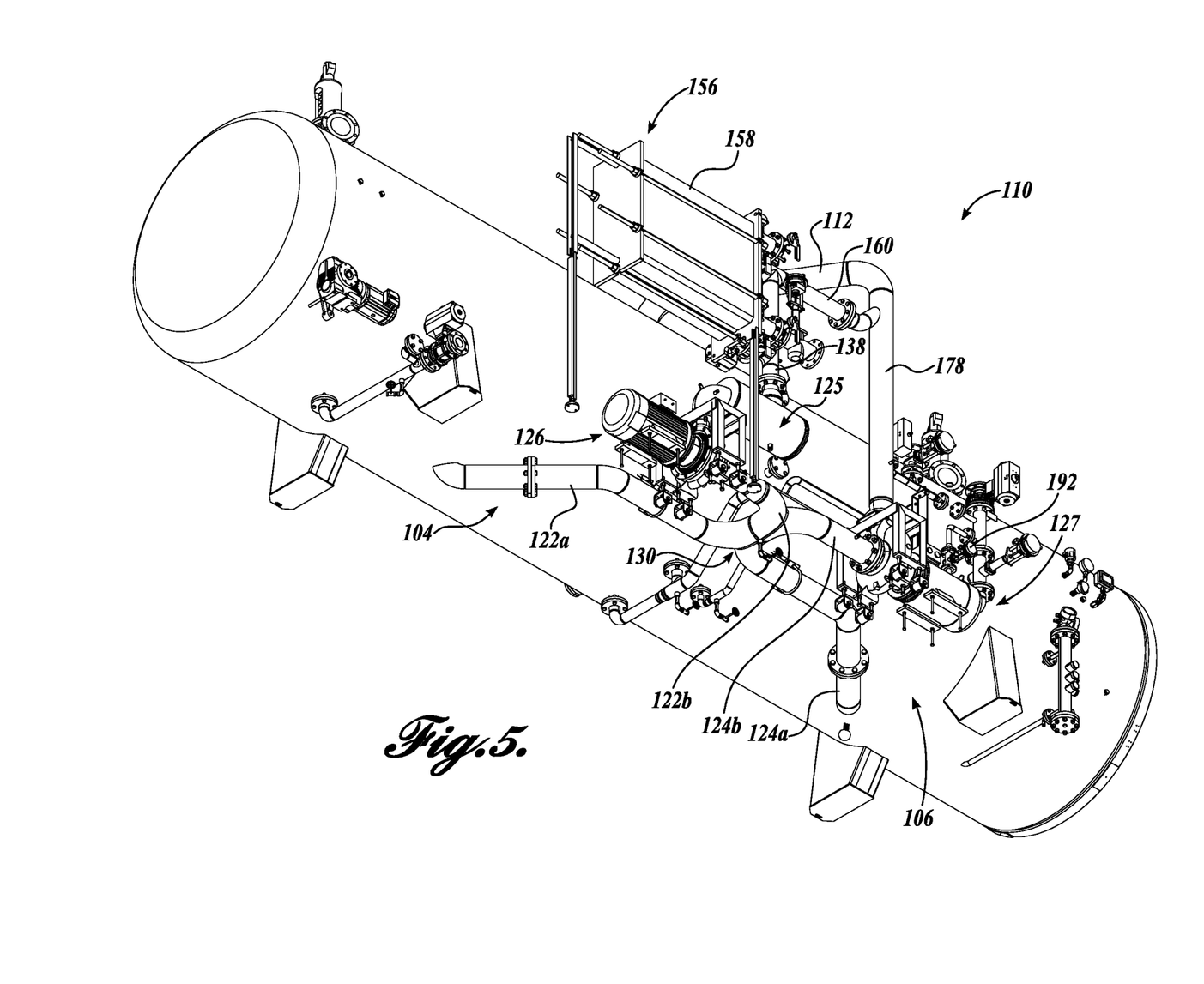
FIG. 5 is a bottom isometric view of the SWS retort system of FIG. 4.

In some embodiments, a steam bypass valve 192 (shown in FIGS. 4 and 5) may be added to the steam inlet circuit to increase the heating rate of the vessel during the come-up phase by adding more steam to the vessel. The steam bypass valve may be used to flow steam into the vessel during the come-up phase and then shut off the flow of steam as the process approaches the cook phase.

Typically the steam replenishes the process fluid with heat as the fluid falls through the load and down into the bottom of the retort vessel. With the improved retort system 110 having a higher flow rate of process fluid 118 through the load 116, each "bit of process fluid" does not stay on a corresponding container C for very long before it passes to another container below (in comparison to a system with a lower flow rate). As a result, the container below is contacted by process fluid at a higher temperature than in a prior art system with a lower flow rate, thus resulting in a more uniform temperature distribution in the load. Furthermore, with a higher flow rate, there are more "bits of process fluid", so even though each "bit of process fluid" does not stay on each corresponding container for a long period of time, the individual containers still heat rapidly in comparison to a prior art system because there are a lot of "bits of process fluid" in the vessel. Accordingly, the steam flowed into the vessel during the come-up phase can be allocated to increasing temperature of the vessel rather than replenishing the process fluid with heat as it falls through the load.

As noted above, the improved SWS retort system 110 differs from the prior art retort system in that it is configured to provide more homogeneous processing and faster cooling by increasing the total fluid flow through the retort with the use of a dedicated, separate pump for the heat exchanger. In that regard, the SWS retort system 110 includes a recirculation circuit 111 collectively defined by a first, heat exchanger circuit 104 that circulates process fluid 118 through a first heat exchanger pump 126 selectively in line with a heat exchanger assembly 156 and back into the vessel 112, and a second, main circuit 106 that circulates process fluid 118 through a second main pump 127 and back into the vessel 112. The circuits 104 and 106 may be combined before and after the first and second pumps 126 and 127 to help distribute the suction along the length of the vessel 112 and to help ensure a thorough mixing of the process fluid 118 before it is reintroduced into the vessel 112 through one or more spraying tubes 113 having a plurality of spray nozzles 114 extending along the length of the interior of the vessel.

In the depicted embodiment, the process fluid 118 that collects in the bottom of the vessel 112 outlets the vessel through a first outlet suction pipe 122 of the heat exchanger circuit 104 and through a second outlet suction pipe 124 of the main circuit 106. The first outlet suction pipe 122 collects fluid from a first section of the vessel 112 (e.g., approximately one half of the vessel) and the second outlet suction pipe 124 collects fluid from a second section of the vessel (e.g., approximately the other half of the vessel). However, before reaching the pumps 126 and 127, the suctioned process fluid is combined through an outlet pipe joint 130 to mix the process fluid from the first and second sections of the vessel 112. The first pipe joint 130 may be defined by merged pipe sections, as shown, through a suitable fitting, or in any other suitable manner.

It should be appreciated that in other embodiments, only one outlet pipe may be used (to collect all the process fluid from the vessel), or more than two outlet pipes may be used (e.g., three outlet pipes may be used to collect process fluid from three sections of the vessel, four outlet pipes may be used to collect process fluid from three sections of the vessel, etc.). In these alternative embodiments, a corresponding number of joints may be used to combine and separate the flow in the recirculation circuit 111 as needed.

As noted above, the first and second outlet suction pipes 122 and 124 may be joined to combine the outlet flow suctioned from the first and second outlet suction pipes 122 and 124 and may then split again to divide the flow of process fluid 118 to the first and second pumps 126 and 127. In that regard, each of the first and second outlet suction pipes 122 and 124 have a first outlet pipe section 122a and 124a (before the first pipe joint 130) and a second outlet pipe section 122b and 124b (after the first pipe joint 130). In other words, the process fluid 118 is flowed into the first and second outlet suction pipe sections 122a and 124a, it is combined at the first pipe joint 130, and then a divided flow of process fluid 118 flows to each pump 126 and 127.

Combining the suctioned flow before the flow is split between the first and second pumps 126 and 127 helps minimize any impact on temperature distribution inside the vessel. Some prior art retort systems include first and second parallel fluid pipe circuits that each use a pump to circulate fluid back into the retort vessel. For instance, the first pipe circuit may circulate fluid back into a front section of the vessel, and a second pipe circuit may circulate fluid back into a back section of the vessel. In such a system, the fluid temperature being sprayed on the front and back sections of the vessel can differ, with one section being hotter or colder than the other section.

Combining the suctioned process fluid before it is divided for the first and second pumps 126 and 127 helps ensure that the entire length of the retort is heated or cooled at substantially the same temperature. Moreover, if the first and second pumps 126 and 127 flow process fluid 118 at a different rate, combining the flow at the first pipe joint 130 helps ensure a more uniform level of fluid 118 in the bottom of vessel 112 by helping to distribute the suction between the outlet openings in the vessel.

As noted above, the heat exchanger circuit 104 circulates process fluid 118 through the first pump 126 and optionally through the heat exchanger assembly 156 before being reintroduced into the vessel 112. More specifically, the process fluid 118 of the heat exchanger circuit 104 flows out of the first pump 126 into a first pump outlet pipe 138. The first pump outlet pipe 138 branches into a heat exchanger inlet pipe 154 having a heat exchanger valve 162 and a bypass portion 160 having a bypass valve 168.

During the cooling phase, the heat exchanger valve 162 and the bypass valve 168 are opened and closed, respectively, to allow process fluid 118 of the heat exchanger circuit 104 to flow into the heat exchanger assembly 156. In that regard, the heat exchanger assembly 156 includes a plate heat exchanger 158 or any other suitable heat exchanger having a first side in selective fluid communication with the heat exchanger inlet pipe 154 (optionally passing through a filter 125). Cooling water flows into a second side of the heat exchanger 158 through a cooling water pipe 164 having a cooling water valve 166. In that manner, heat is removed from the part of the process fluid 118 circulated through the first side of the heat exchanger 158 by the cooling water passing through the second side of the heat exchanger. The cooled process fluid 118, after passing through the heat exchanger 158, flows into a heat exchanger outlet pipe 172 that joined with a first recirculation pipe 176 through a suitable fitting or otherwise. It should be appreciated that any other suitable heat exchanger assembly may instead be used.

When no cooling is desired (such as during the come-up or cook/hold phases), the process fluid 118 bypasses the heat exchanger 158 through the bypass portion 160 by closing the heat exchanger valve 162 and opening the bypass valve 168. The bypass portion 160 is also joined with the first recirculation pipe 176 through a suitable fitting or otherwise.

The first recirculation pipe 176 is joined with a second recirculation pipe 178 of the main circuit 106 at a second pipe joint 180 to combine the process fluid 118 of the first and second pipe circuits 104 and 106 before being reintroduced into the vessel 112. The second recirculation pipe 178 extends between the second pump 127 and the second pipe joint 180. The first and second recirculation pipes 176 and 178, when joined, combine the process fluid 118 in a vessel recirculation pipe 182 that reintroduces the combined (optionally cooled) process fluid into the vessel 112. Combing the process fluid 118 from the heat exchanger and main circuits 104 and 106 (whether the process fluid is cooled or not) helps ensure that the entire length of the retort is heated or cooled at substantially the same temperature.

The dedicated first and second pumps 126 and 127 may be selected for an optimal flow rate of the corresponding heat exchanger or main circuit 104 or 106 and ultimately for an optimal overall combined flow rate through the vessel recirculation pipe 182 into the vessel. For instance, in one embodiment, the second pump 127 of the main circuit 106 is a high flow, low output pressure (head) pump suitable for circulating process fluid in the retort vessel at a suitable flow rate (e.g., gallons per minute (gpm)) when combined with the process fluid flow of the heat exchanger circuit 104. The selected pump will also correspond to the percentage of total flow in the corresponding pipe circuit. For instance, in one embodiment, the first pump 126 flows approximately 15-50% of the total process flow, and the second pump 127 flows approximately 50-85% of the total process flow. In a specific embodiment, the first pump 126 flows approximately 33% (or ⅓) of the total process flow, and the second pump 127 flows approximately 66% (or ⅔) of the total process flow.

The first pump 126 of the heat exchanger circuit 104, which is used to flow process fluid through the heat exchanger 158 during the cooling phase, may be sized and/or configured to maximize the efficiency of the heat exchanger and to optimize cooling capacity for the system. In that regard, the first pump 126 may be a low flow, high output pressure (head) pump when compared to the second pump 127 of the main circuit 106. In one embodiment, the first pump 126 has an output head pressure that is about twice as much output head pressure as the second pump 127.

The ability to use a low flow, high output pressure (head) pump for the heat exchanger assembly 156 allows for the use of higher turbulence plates (and/or more plates can be added to the heat exchanger 158). In other words, the higher output pressure of the first pump 126 can sufficiently push the process fluid 118 through the higher turbulence (or increased number of) plates. By comparison, prior art systems using only a single pump are limited in the type and number of plates that can be used for the heat exchanger. A heat exchanger having higher turbulence (or an increased number of) plates increases the heat transfer capacity of the heat exchanger 158. As a result, the overall cooling capacity of the SWS retort system 110 is increased when compared to prior art systems. Moreover, the second pump 127 and heat exchanger 158 can be optimally configured for the specific application of the retort system 110. The ability to select a specific pump for a corresponding heat exchanger (and vice versa) increases the flexibility and usability of the recirculation circuit 111 for many different applications.

The use of dedicated pumps 126 and 127 for each of the heat exchanger circuit 104 and the main circuit 106, respectively also provides more homogeneous processing and faster cooling when compared to prior art systems. In that regard, the SWS retort system 110 is configured to increase the total fluid flow through the vessel 112 and hence reduce the temperature differences in the load 116 during the cooling phase without the drawbacks of using a single larger pump and motor, as noted above. By using a dedicated pump 126 and 127 for the heat exchanger circuit 104 and the main circuit 106, each dedicated pump will have a lower Net Positive Suction Head required (NPSHr) compared to a single pump of a prior art system configured to flow the same increased total flow at the same output pressure. More specifically, by using separate pumps for the heat exchanger circuit 104 and the main circuit 106, each pump 126 and 127, respectively can be tailored to the piping restrictions (e.g., diameter, fittings, etc.) down-stream from the pump. In that regard, the pump can be tailored to minimize its NPSHr, maximize flow output characteristics of the downstream piping, and supply an effective amount of cooled process fluid from the heat exchanger 158 (thereby improving the cost efficiency of the retort system 110, making it more environmentally friendly, etc.). With a lower NPSHr for each pump 126 and 127, less overpressure is also required in the vessel 112, as discussed above. Moreover, by using a dedicated pump for each of the heat exchanger circuit 104 and the main circuit 106, rather than using a single larger pump suitable to increase total flow, the overall height of the retort does not need to increase.

The higher flow (or higher gpm through the retort vessel) improves the homogeneity of the load process. As can be appreciated, as the process fluid 118 flows through the load 116 to heat up or cool down the containers C, the temperature of the process fluid decreases as it moves through the load. As a result, there is a temperature difference between the top and bottom containers C during the heating or cooling phase. The higher the flow of process fluid, the smaller this temperature difference becomes. Thus, with a higher flow during the come-up phase, for instance, the slowest heating point in the load 116 (i.e., the bottom containers C) reaches the process temperature quicker such that the come-up time is reduced. The same is true for the cooling phase. In other words, with a higher flow during the cooling phase, the bottom containers C reach the cooling temperature quicker such that the cooling time is reduced. The higher flow of process fluid, in combination with a higher capacity of the heat exchanger 158, significantly reduces the cooling time. The reduction in process times increases the productivity of the retort system 110.

Furthermore, with the heat exchanger circuit 104 and the main circuit 106 each having a dedicated pump 126 and 127, the flow of process fluid in the vessel 112 during the cooling phase could be substantially matched to the flow in the come-up and cook/hold phases. As noted above, the heat exchanger 158 is bypassed during the come-up and cook/hold phases through a bypass portion 160 that is in series with a bypass valve 168. The bypass valve 168 can be throttled in a manner well known in the art (e.g., by flowing a specific portion of the process fluid through the valve) to either match the pressure drop to the heat exchanger 158, so the total process flow in come-up and cook/hold matches the total process flow during the cooling phase, and/or to allow more flow during the come-up phase compared to the cooling phase.

To accommodate a higher flow of the recirculation circuit 111, the spraying tubes 113 may be equipped with clog-resistant nozzles 114 having a large free passage. Strainer(s) (not shown) with holes much smaller than the free passage in the nozzles maybe placed on the inside the vessel 112 at the openings to each outlet suction pipe 122 and 124 to limit the size of particles that can enter the first and second pumps 126 and 127, respectively. By using strainers at the outlet openings, a filter or strainer in the main circuit 106 can be eliminated, which would otherwise be needed to minimize the risk of blocking the spray nozzles 114. The use of larger free passage high flow nozzles, the removal of a filter in main circuit 106, and optimized piping geometry all reduce the pressure drop in the main circuit 106 such that a high flow low output pressure pump 127 can be used.

The system 110 may be in wired or wireless communication with a controller 170 that can be programmed in accordance with process requirements of the load 116. For instance, the controller 170 may include suitable pipe circuitry for selectively opening one or more valves of the system 110 for ensuring that a pre-programmed temperature profile (which can be adjusted with steam and/or cooled process fluid) and a pre-programmed pressure profile (which can be adjusted with pressurized air) is followed. In some embodiments, the controller 170 may include suitable pipe circuitry for activating other components of the system (such as sensors, switches, etc.) and/or for processing input or output signals of the various components.

Figure 6:
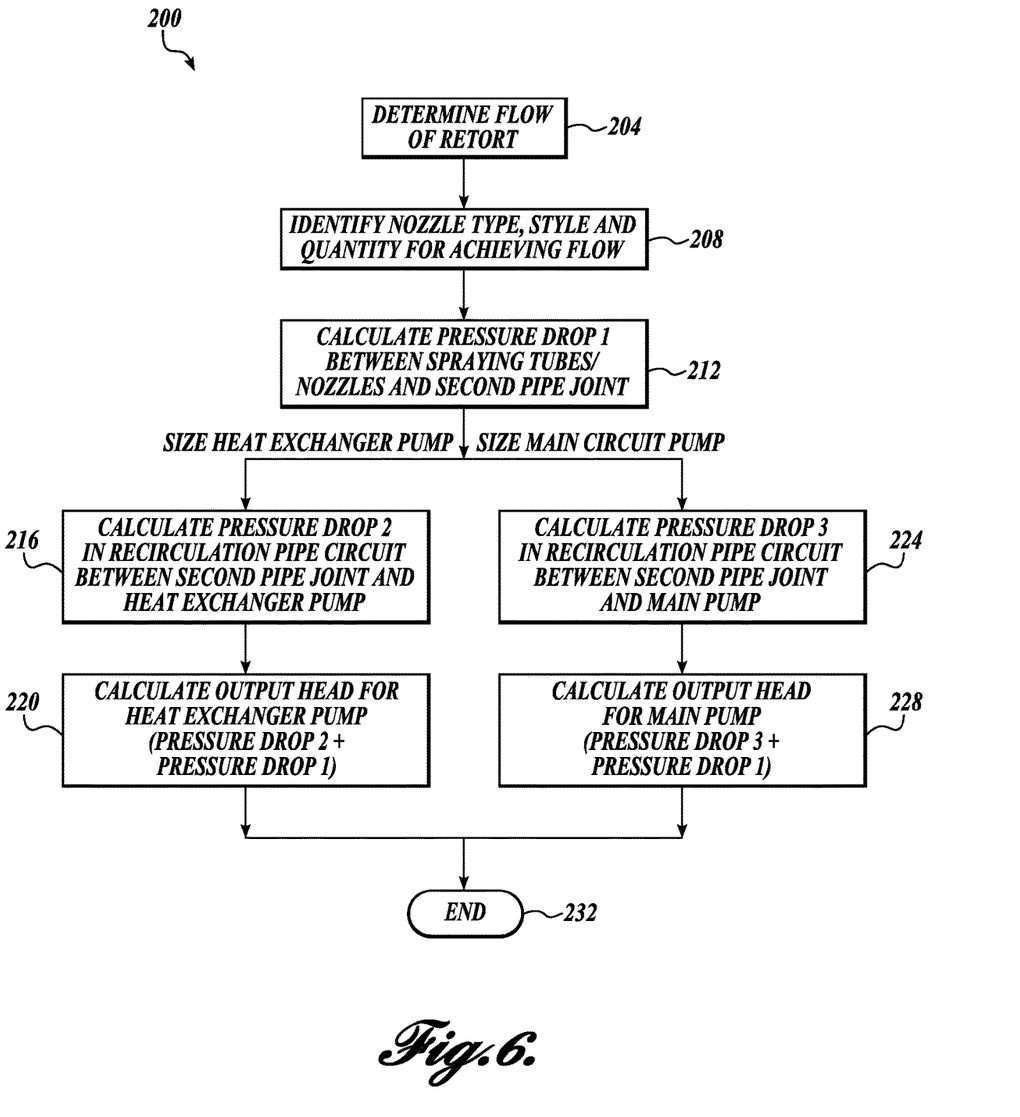
FIG. 6 is a flow chart depicting a method of optimizing a retort system formed in accordance with an exemplary embodiment of the present disclosure.

Referring to FIG. 6, a method 200 of optimizing the recirculation circuit 111 of the SWS retort system 110 is depicted. In a first step 204, a desired flow rate of the retort system is determined. The desired flow may depend on various factors, such as the size of the retort vessel 112, the type of load 116 to be processed (trays, baskets, etc.), the type of container C in the load (pouches, cans, paperboard containers, etc.), the configuration of heat exchanger 158 desired (a plate heat exchanger, a double pipe heat exchanger, a shell and tube heat exchanger, etc.), the piping diameter of one or more portions of the recirculation circuit 111, etc. For instance, smaller retorts will contain a smaller load to process, so the overall flow could be reduced. A retort having a larger processing capacity (such as by increasing the diameter of the vessel and/or creating a longer retort that will hold a larger load) would require a higher total flow.

At step 208, the configuration of the nozzles 114 may be chosen based on the desired flow rate of the retort system. In particular, the type of nozzle (flow rate, fluid passage size, etc.), the quantity of nozzles, and the style of nozzle (fan, cone, etc.) may be chosen to best achieve or otherwise accommodate the desired flow rate and spray pattern. The nozzle selection in step 208 may include selecting a variety of nozzle configurations within a certain range (e.g., within a range of flow rates, within a range of the quantity used, etc.), or it may include identifying certain styles or types that may work for the desired flow rate of the retort system. In that regard, the nozzle selection in step 208 may be adjusted or modified as other steps of the method 220 are carried out.

With a nozzle configuration selected, at step 212 a pressure drop ("Pressure Drop 1") is calculated between the spraying tubes 113 (including the nozzles 114) and the second pipe joint 180. To size the heat exchanger or first pump 126, at step 216 a pressure drop ("Pressure Drop 2") is calculated between the second pipe joint 180 and the heat exchanger pump 126. This Pressure Drop 2 calculation includes all the pressure drops from the recirculation circuit piping, such as the first pump outlet pipe 138, the filter 125, the heat exchanger inlet pipe 154, the heat exchanger valve 162, the heat exchanger 158, the heat exchanger outlet pipe 172, and the first recirculation pipe 176. At step 220, the approximate output head of the first pump 126 is determined by adding Pressure Drop 2 and Pressure Drop 1. Of note, the required output head of the first pump 126 will be greater than the output head required for the main or second pump 127.

In that regard, to size the main or second pump 127, at step 224 a pressure drop ("Pressure Drop 3") is calculated between the second pipe joint 180 and the second pump 127, including the second recirculation pipe 178. At step 228, the approximate output head of the second pump 127 is determined by adding Pressure Drop 3 and Pressure Drop 1. Of note, the required output head of the second pump 127 will be less than the output head required for the first pump 126.

It should be understood that the above-described method may instead include additional steps not described. Moreover, the steps may instead be rearranged or repeated as necessary to achieve a retort system configuration that produces a desired flow. Accordingly, the steps described herein should not be seen as limiting the scope of the claimed subject matter.

EXPERIMENT

An experiment was conducted to measure the flow rate of an improved SWS retort system (e.g., a 2 pump system) in comparison to a prior art retort system (e.g., a 1 pump system).

The prior art retort system was an A186 steam water spray retort available from JBT Corporation of Chicago, Ill. The prior art retort system was configured generally as shown in FIG. 1, and included the following parameters:
  Vessel Size: 1800 mm diameter
  Heat Exchanger:
    Plate type: Medium/Low (ML) turbulent plates
    Heat load rating: 5,361 kBtu/hr
  Circulation Pump:
    Approximate flow rate: 1350-1550 gpm
    Output head: feet 60 (ft)
    Motor size: horsepower 30 (hp)

During operation, the total flow of the prior art A186 steam water spray retort system during the come-up and cook/hold phases was approximately 1350-1500 gpm (306-340 m³/hr) with a total pump flow to load volume ratio of about 3.5-4.25 gpm/cubic feet (gpm/ft^3) of the load (such as the volume of a retort basket). The total flow during the cooling phase was approximately 1200 gpm (272 m³/hr) with a total pump flow to load volume ratio of about 3-3.5 gpm/ft^3.

Of note, the "load" is generally defined as a mass of containers placed inside the retort vessel, such as containers received in at least one basket, a tray stack, or other similar structure. The "load volume" is generally defined as the volume of space the load takes up inside the retort vessel (such as the volume of each basket/tray stack multiplied by the number of baskets/tray stacks in the retort). During a load process, a flow of process fluid passes through the load volume to heat and cool the load during its respective process phase. The total pump flow to load volume for a retort is thus understood as the total pump flow that is flowing through the load divided by the total load volume (gpm/cubic feet). In that regard, the total pump flow to load volume is a ratio that can be compared between retorts of different sizes (e.g., 1400 mm retort versus an 1800 mm retort) even if the total pump flow differs between the retorts. In other words, the overall flow rate of the retort can change based on how much product/load is in the retort. For example, a smaller retort may only process two baskets, whereas a larger retort may process ten baskets. Both retorts would not flow the same gpm, but using a retort system 110 in accordance with the present disclosure, they would have similar flow to load volume ratios.

The improved SWS retort system was configured generally the same as the system 110 described above, and included the following equipment parameters:
  Vessel Size: 1800 mm diameter
  Heat exchanger pump (first pump):
    Approximate flow rate: 800 gpm
    Output head: 110 feet (ft)
    Motor size: 30 horsepower (hp)
  Main pump (second pump):
    Approximate flow rate: 1500 gpm
    Output head: 55 ft
    Motor size: 30 hp
  Heat exchanger:
    Plate type: High (H) turbulent plates
    Heat load rating: 8,225 kBtu/hr
  Steam inlet piping modifications:
    A one inch (1") bypass ball valve was added to the steam inlet circuit, which was sized to flow approximately seventy percent (70%) of a typical larger control valve flow.
    The bypass valve was used during the come-up phase and then shut off as the process approaches the cook phase to help heat the retort vessel.

Using the improved SWS retort system, the total flow during the come-up, cook/hold, and cooling phases was approximately 2110-2500 gpm (475-570 m³/hr) with a flow to load volume ratio of about 5.65-6.73 gpm/ft^3.

Accordingly, it can be appreciated that the total flow through the retort vessel is significantly increased using the improved SWS retort system 110. Moreover, with the use of a dedicated pump, the heat exchanger capacity was approximately 45% greater than the heat exchanger used in the prior art system (or effectively about 145% capacity of the prior art system). Accordingly, the cooling phase was reduced by about 5 minutes.

By adjusting component parameters using the method set forth above or in another suitable manner, the total flow of an improved SWS retort system could also be increased from 2110-2500 gpm to 3000 gpm or higher with a flow to load volume ratio as high as about 8.08 gpm/ft^3.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. Moreover, in some instances, well-known structures or process steps have not been described in detail in order not to unnecessarily obscure various aspects of the present disclosure.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, it will be appreciated that embodiments of the present disclosure may employ any combination of features described herein.

Language such as "top", "bottom", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

The present application may also include modifiers, such as the words "generally," "approximately", "about", or "substantially." These terms are meant to serve as modifiers to indicate that the "dimension," "shape," or other physical parameter or specification in question need not be exact, but may vary as long as the function that is required to be performed can be carried out.

Also, the present disclosure describes a recirculation circuit for a retort system. However, it should be appreciated that the recirculation circuit may be used with any suitable fluid or liquid and in any type of retort or other system. In that regard, the terms "process a load", "load process", and the like are meant to include any suitable pasteurization, commercial sterilization, thermal process, or similar. The terms "fluid," "process fluid", or the like are meant to include any suitable fluid, such as water, steam, etc. The terms "pipe" or "circuit" are meant to include any suitable structure for flowing the process fluid. The terms "load", "container", and the like are meant to include any food or beverage product, medical product, etc., that may be processed with heat in a retort or similar processing vessel. In other words, the terms used herein are meant to help described exemplary embodiments of an improved SWS retort system and/or a recirculation circuit for a retort or other system, and should not be seen as limiting the scope of the claimed subject matter. Many embodiments of the technology described herein may take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller, data processor, or logic pipe circuitry that is specifically programmed, configured or constructed to perform one or more of the computer-executable instructions described above. Accordingly, the terms "computer" and "controller" as generally used herein refer to any suitable data processor.

While illustrative embodiments have been illustrated and described, it will be appreciated that various changes can be made therein without departing from the spirit and scope of the invention.

The embodiments of the invention in which an exclusive property or privilege is claimed are defined as follows:

1. A recirculation circuit for a processing vessel configured to process a load with a process fluid, the recirculation circuit comprising:
   a first circuit portion configured to recirculate a first portion of the process fluid through the vessel, the first circuit portion comprising:
      a first pump having a first flow rate capacity and a first rated output pressure;
      a heat exchanger inlet pipe having a heat exchanger valve configured to be selectively opened for flowing process fluid in the first circuit portion to a heat exchanger; and
      a bypass portion pipe having a bypass valve configured to be selectively opened for flowing process fluid through the bypass portion pipe;
   a second circuit portion configured to recirculate a second portion of the process fluid through the vessel, the second circuit portion comprising:
      a second pump having a second flow rate capacity higher than the first flow rate capacity and a second rated output pressure lower than the first rated output pressure,
   wherein the first pump and the second pump continuously recirculate process fluid through the vessel; and
   a controller programmed in accordance with process requirements of the load, the controller including pipe circuitry for selectively opening the heat exchanger valve and the bypass valve, wherein the controller closes the heat exchanger valve and opens the bypass valve during a first phase of the thermal process, and wherein the controller opens the heat exchanger valve and closes the bypass valve during a second phase of a thermal process;
   wherein the bypass valve is throttled to substantially match a first pressure drop in the heat exchanger inlet pipe to a second pressure drop in the bypass portion pipe during the first phase of the thermal process such that the flow of process fluid in the processing vessel during the first phase substantially matches the flow of process fluid in the processing vessel during second phase.

2. The recirculation circuit of claim 1, wherein the first phase is one of a come-up and cook/hold phase and the second phase is a cooling phase.

3. The recirculation circuit of claim 1, wherein the first pressure drop in the heat exchanger inlet pipe is the pressure drop across the heat exchanger.

4. The recirculation circuit of claim 1, wherein the first circuit portion includes a first pipe section defined between the vessel and the first pump and the second circuit portion includes a first pipe section defined between the vessel and the second pump, and wherein the first pipe sections of the first and second circuit portions are joined along a portion of their length to define a first joint.

5. The recirculation circuit of claim 4, wherein the first circuit portion includes a second pipe section defined between the first pump and the vessel and the second circuit portion includes a second pipe section defined between the second pump and the vessel, and wherein the second pipe sections of the first and second circuit portions are joined along a portion of their length to define a second joint.

6. The recirculation circuit of claim 5, wherein the second pipe section of the first circuit portion is joined with the second pipe section of the second circuit portion between the heat exchanger and the vessel.

7. A method of optimizing the recirculation circuit recited in claim 5, comprising:
 determining a flow rate of the process fluid through the vessel;
 selecting an input assembly for flowing process fluid into the vessel;
 calculating a third pressure drop between the input assembly and the second joint;
 calculating a fourth pressure drop between the second joint and the first pump;
 calculating a first output head by adding the third pressure drop to the fourth pressure drop; and
 selecting the first pump based on the calculated first output head.

8. The method of claim 7, further comprising:
 calculating a fifth pressure drop between the second joint and the second pump;
 calculating a second output head by adding the third pressure drop to the fifth pressure drop; and
 selecting the second pump based on the calculated second output head.

9. A method of optimizing the recirculation circuit recited in claim 8, comprising:
 determining a flow rate of the process fluid through the vessel;
 selecting an input assembly for flowing process fluid into the vessel;
 calculating a third pressure drop between the input assembly and the second joint;
 calculating a fifth pressure drop between the second joint and the second pump;
 calculating a second output head by adding the first pressure drop to the fifth pressure drop; and
 selecting the second pump based on the calculated second output head.

10. The recirculation circuit of claim 1, wherein the first circuit portion includes a second pipe section defined between the first pump and the vessel and the second circuit portion includes a second pipe section defined between the second pump and the vessel, and wherein the second pipe sections of the first and second circuit portions are joined along a portion of their length.

11. The recirculation circuit of claim 1, wherein the heat exchanger is a plate heat exchanger.

12. The recirculation circuit of claim 1, wherein the first circuit portion is configured to be fluidly connected to at least a first fluid outlet of the vessel and the second pipe circuit is configured to be fluidly connected to at least a second fluid outlet of the vessel.

13. The recirculation circuit of claim 1, wherein the first circuit portion is configured to recirculate between 15-50% of the process fluid through the vessel, and the second circuit portion is configured to recirculate between 50-85% of the process fluid through the vessel.

14. The recirculation circuit of claim 1, wherein the first and second circuit portions continuously recirculate process fluid through the vessel to produce a flow to load volume through the processing vessel up to 8 gpm/ft$^3$.

15. The recirculation circuit of claim 1, wherein the second pump has a second rated output pressure that is about half of the first rated output pressure.

16. The recirculation circuit of claim 1, further comprising:
 at least one strainer configured to strain fluid flowing from the vessel to the first and second circuit portions, the strainer having openings of a first size;
 at least one nozzle in fluid communication with the first and second circuit portions having openings of a second size larger than the first size; and
 a filter located between the first pump and the heat exchanger.

17. A method of circulating process fluid in a processing vessel, comprising:
 providing a first circuit portion configured to recirculate a first portion of the process fluid through the vessel, the first circuit portion comprising:
  a first pump having a first flow rate capacity and a first rated output pressure;
  a heat exchanger inlet pipe having a heat exchanger valve configured to be selectively opened for flowing process fluid in the first circuit portion to a heat exchanger; and
  a bypass portion pipe having a bypass valve configured to be selectively opened for flowing process fluid through the bypass portion pipe;
 providing a second circuit portion configured to recirculate a second portion of the process fluid through the vessel, the second circuit portion comprising:
  a second pump having a second flow rate capacity higher than the first flow rate capacity and a second rated output pressure lower than the first rated output pressure;
 during a first phase of a thermal process:
  closing, with a computing device, the heat exchanger valve;
  opening, with a computing device, the bypass valve to flow process fluid in the first circuit portion to the bypass portion pipe; and
  throttling the bypass valve to substantially match a first pressure drop in the heat exchanger inlet pipe to a second pressure drop in the bypass portion pipe;
 during a second phase of a thermal process:
  opening, with a computing device, the heat exchanger valve to flow process fluid in the first circuit portion to the heat exchanger; and
  closing, with a computing device, the bypass valve; and
 during both the first phase and the at second phase of the thermal process, continuously recirculating process fluid through the vessel with the first pump and the second pump.

18. The method of claim 17, further comprising combining the flow of the process fluid as it flows out of the vessel to the first and second pumps.

19. The method of claim 17, wherein the first portion of process fluid is between 15-50% of the process fluid circulating through the vessel, and wherein the second portion of process fluid is between 50-85% of the process fluid circulating through the vessel.

20. The method of claim 17, further comprising:
during both the first and second phases, producing a flow to load volume through the processing vessel up to 8 gpm/ft$^3$.

21. The method of claim 17, wherein the first phase is one of a come-up and cook/hold phase and the second phase is a cooling phase.

* * * * *